(12) United States Patent
Turner

(10) Patent No.: US 7,523,486 B1
(45) Date of Patent: Apr. 21, 2009

(54) USER ADMINISTRATION TOOL

(75) Inventor: Joshua D. Turner, Kansas City, MO (US)

(73) Assignee: Sprint Communications Company LP, Overland Park, KS (US)

( * ) Notice: Subject to any disclaimer, the term of this patent is extended or adjusted under 35 U.S.C. 154(b) by 798 days.

(21) Appl. No.: 10/794,658

(22) Filed: Mar. 5, 2004

(51) Int. Cl.
G06F 7/04 (2006.01)

(52) U.S. Cl. .................. 726/2; 713/182; 726/3; 726/4; 726/28; 726/16; 726/30; 707/9; 715/738; 715/741

(58) Field of Classification Search .......... 713/182, 713/155; 726/4, 17, 21, 1, 2, 16, 19; 715/738, 715/741, 743, 745, 811
See application file for complete search history.

(56) References Cited

U.S. PATENT DOCUMENTS

| | | | |
|---|---|---|---|
| 6,088,679 A * | 7/2000 | Barkley | 705/8 |
| 6,128,012 A * | 10/2000 | Seidensticker et al. | 345/685 |
| 6,640,307 B2 * | 10/2003 | Viets et al. | 726/15 |
| 6,826,725 B1 * | 11/2004 | Beezer et al. | 715/209 |
| 7,185,364 B2 * | 2/2007 | Knouse et al. | 726/8 |
| 7,194,253 B2 * | 3/2007 | Ritter et al. | 455/414.1 |
| 7,200,563 B1 * | 4/2007 | Hammitt et al. | 705/7 |
| 7,225,400 B2 * | 5/2007 | Beezer et al. | 715/205 |
| 7,343,625 B1 * | 3/2008 | Zaidi et al. | 726/25 |
| 7,392,546 B2 * | 6/2008 | Patrick | 726/26 |

OTHER PUBLICATIONS

Ken Boydstun, et al., *Security Framework Bridge*, filed Oct. 31, 2002, U.S. Appl. No. 10/284,680, Specification (45 pgs.) and Drawings (3 sheets).
Kenneth C. Boydstun, et al., *Business-to-Business Security Integration*, filed Jul. 31, 2003, U.S. Appl. No. 10/631,984, Specification (29 pgs.) and Drawings (3 sheets).

* cited by examiner

*Primary Examiner*—Kimyen Vu
*Assistant Examiner*—April Y Shan

(57) ABSTRACT

A tool for administering users of a security system is provided. The security system includes a storage component stored on a computer readable medium, a centrally located graphical user interface stored on a computer readable medium, and an engine stored on a computer readable medium. The storage component maintains roles data that includes an authorization component and an application component, wherein the application component includes at least one role defined by a third party application. The centrally located graphical user interface manages the application component and the authorization component. The engine communicates with the storage component via a security system application programming interface, uses the authorization component to determine whether to grant access to the third party application, and communicates the application component to the third party application which uses the application component to determine a level of access within the third party application.

7 Claims, 5 Drawing Sheets

USER ADMINISTRATION TOOL

CROSS-REFERENCE TO RELATED APPLICATIONS

This application contains subject-matter related to U.S. patent application Ser. No. 10/284,680, filed Oct. 31, 2002, entitled "Security Framework Bridge", by Ken Boydstun, et al, and to U.S. patent application Ser. No. 10/631,984, filed Jul. 31, 2003, entitled "Business-to-business Security Integration", by Kenneth Boydstun, et a/, both of which are incorporated herein by reference for all purposes.

STATEMENT REGARDING FEDERALLY SPONSORED RESEARCH OR DEVELOPMENT

Not applicable.

REFERENCE TO A MICROFICHE APPENDIX

Not applicable.

FIELD OF THE INVENTION

The present invention is directed to computer security, and more particularly, but not by way of limitation, to a system and method for administering user information for users who are subject to authentication and authorization as a condition of being granted access to computer resources.

BACKGROUND OF THE INVENTION

Security is a concern at many levels in computer systems. Typically when users log on to a computer system or log on to a secure application they must identify themselves and are challenged to authenticate themselves by entering a private password or by some other method of authentication. In addition to authenticating the user, computer systems or secure applications may check that a user is authorized to access the specific application which the user is attempting to access, a process called authorization.

The computer system or secure application may store user security information, user profiles, or user account information each of which contains the user's password (sometimes in encrypted form), the access privileges of the user, and other secure information. Creating the user security information or the user profile may be referred to as creating a user account or creating a user. Similarly, deleting or modifying the user security information or the user profile may be referred to as deleting or modifying the user account or deleting or modifying the user.

Creating users, deleting users, modifying users, generating reports on users, and other administrative processing of users in a computer security system or database may become tedious, time consuming, and error prone as the number of users administered within a centralized computer system increases.

SUMMARY OF THE INVENTION

The present disclosure provides a system for securely maintaining and administering users. The system includes a storage component, a security component, and a security application program interface. The storage component is operable to maintain user profiles. The security component is in communication with storage component to receive the user profiles, the security component having services operable to authenticate and authorize users. The security application programming interface coupled to the security component and operable for accessing of services of the security component. The system further includes a wrapper application programming interface, a user administration tool and a graphical user interface. The wrapper application programming interface in communication with the security application programming interface and operable to communicate with applications to limit access to the services of the security component via the security application programming interface by applications. The user administration tool in communication with the wrapper application programming interface, the user administration tool having a plurality of services operable to administer the user profiles. A centrally located graphical user interface is provided that is operable for accessing the plurality of services of the user administration tool to administer the user profiles.

In one embodiment, the present disclosure provides a tool for administering users of a security system. The tool includes a storage component, a centrally located graphical user interface and an engine. The storage component is operable to maintain roles data including an authorization component and an application component. The centrally located graphical user interface is operable to manage the application component and the authorization component. The engine is operable to communicate with the storage component via a security system application programming interface, the engine operable to use the authorization component to determine whether to grant access to third party applications, the application component communicated to the third party application which uses the application component to determine a level of access within the third party application.

The present disclosure provides a method for administering users of a security system to provide secure access to a system. The method includes communicating with a data store maintaining user profiles via a security application program interface and managing the user profiles including assigning roles to the user profiles via a web based graphical user interface. The method provides for assigning privileges to the roles, providing third party applications, and associating roles with the third party applications. The method also includes permitting users to access the third party application based on the privilege of the user, and determining, by the third party application, a level of access by users to portions of the third party application based on the role of the application and the role of the user.

These and other features and advantages will be more clearly understood from the following detailed description taken in conjunction with the accompanying drawings and claims.

BRIEF DESCRIPTION OF THE DRAWINGS

For a more complete understanding of the present disclosure and the advantages thereof, reference is now made to the following brief description, taken in connection with the accompanying drawings and detailed description, wherein like reference numerals represent like parts.

DETAILED DESCRIPTION OF THE PREFERRED EMBODIMENTS

It should be understood at the outset that although an exemplary implementation of one embodiment of the present disclosure is illustrated below, the present system may be implemented using any number of techniques, whether currently known or in existence. The present disclosure should in no way be limited to the exemplary implementations, drawings, and techniques illustrated below, including the exemplary design and implementation illustrated and described herein.

Secure computer applications may need to authenticate a user before satisfying the request of the user for services. Authentication is often based on retaining user information and requiring the user to provide some secure information such as a password to authenticate the identity of the user. The secure information may be stored in a user profile or in user account information. Creating the user security information may be referred to as creating a user account or creating a user. The need arises for the secure applications or the computer systems on which the secure applications execute to create and manage user security information or user profiles as new user accounts are created or as new users are created. This activity may be referred to as user administration. A secure computer application may be any computer application which imposes any security restrictions on users, for example authenticating a user as described above before providing services to the user.

Typically, a computer system or application provides a set of commands or an application programming interface (API) which an administrator may use to create and modify user accounts. The commands may be limited in capability and may be different for different computer systems and may be different for different applications.

In the past, each development team developed their own user administration tools. This resulted in much duplication of effort. Rather than burden each secure application development team with the responsibility to develop user administration tools, a reusable user administration tool is needed.

Figure 1:
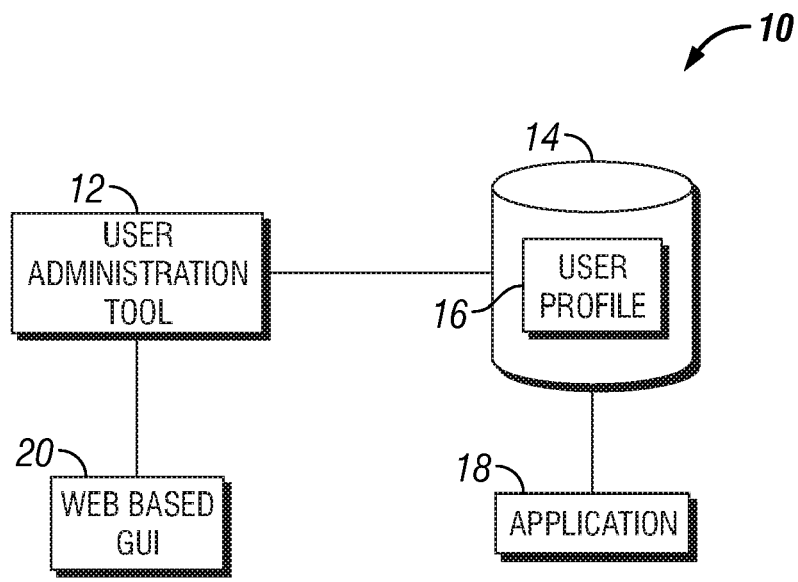
FIG. 1 depicts an embodiment of a user administration tool system.

Turning now to FIG. 1, a block diagram of a user administration tool system 10 is depicted. A user administration tool 12 is in communication with a database 14 which contains a user profile 16 that includes secure information about a user. This information may include, for example, user name, first and last name, password, social security number, home address, a list of groups to which the user belongs, and a list of roles which the user may fill. The information is secure both in the sense that the information is private and should not be disclosed to unauthorized parties and in the sense that the information is employed in authenticating the user and authorizing access of the user to an application 18. The user administration tool 12 is operable to create, delete, and modify the user profile 16. The application 18 is in communication with the database 14 and employs the user profile 16 to authorize operations invoked on behalf of a user associated with the user profile 16.

The user administration tool 12 is a centrally hosted web application. A web based graphical user interface (GUI) 20 is in communication with the user administration tool 12. Technicians responsible for administering the application 18 may invoke the GUI 20 on their desktop computers or workstations using a web browser and administer users by using the controls provided by the GUI 20. As a web application, changes to the centrally hosted user administration tool 12, for example changes which upgrade the user administration tool 12 with extended functionality, are immediately accessible to the GUI 20 without any need to update software installed on desktop computers or workstations.

While only one application 18 is depicted in FIG. 1, it is contemplated that multiple applications would access the database 14 to look up the user profile 16 to authenticate users. The user profile 16 may be accessed by more than one application 18. Additionally, while only one GUI 20 is depicted, several administrators concurrently could invoke the GUI 20 on their desktop computers via their web browsers.

Figure 2:
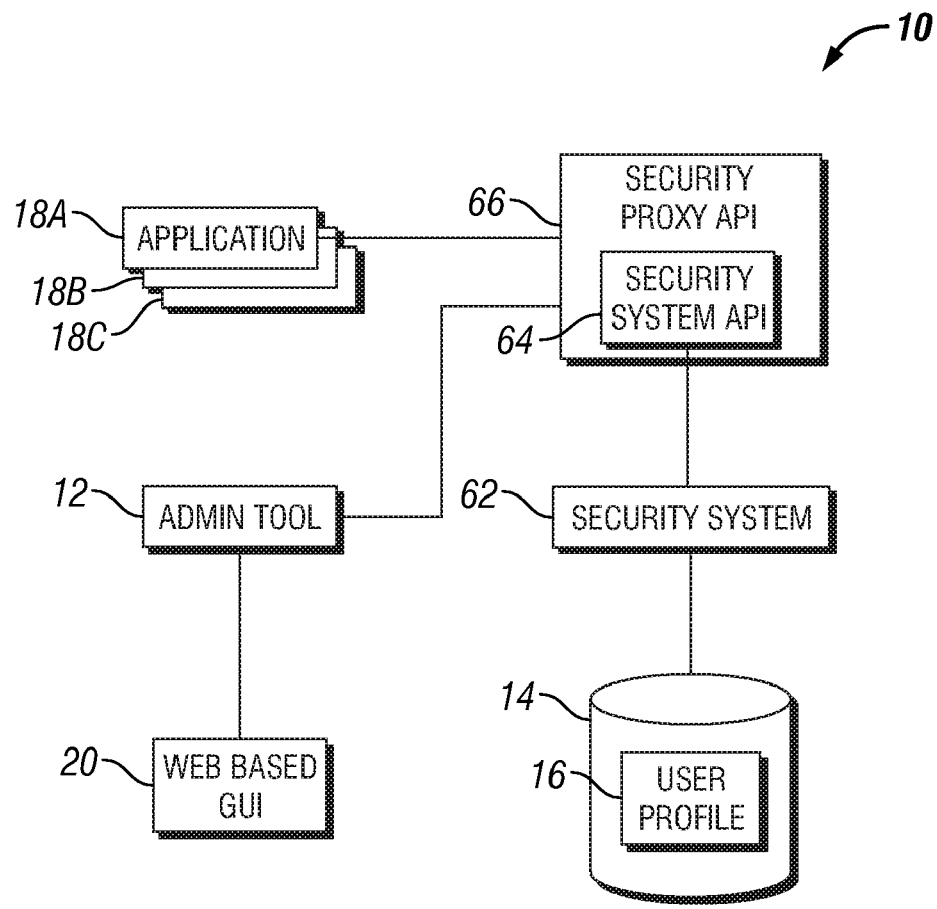
FIG. 2 depicts another embodiment of a user administration tool system.

Turning now to FIG. 2, another embodiment of the user administration tool system 10 is depicted. The database 14 containing user profiles 16 is managed by a security system 62 which provides security services to secure applications 18a, 18b, and 18c. The services of the security system 62, including user authentication and user profile administration, are made available through an application programming interface (API) 64. The security system 62 and associated API 64 are both computer programs which may be developed by the enterprise or may be proprietary third party software.

The API 64 is wrapped by a security proxy API 66. The security proxy API 66, also referred to as a security proxy bridge, is said to be a "wrapper of the API 64" because it provides an interface to the services or functions of the security system 62 which employs the API 64 but hides the API 64 from other enterprise applications. The security proxy API 66 also provides some business logic, including a more robust search functionality than that supported directly by the security system 62. The security proxy API 66 is employed to prevent direct access of the applications 18a, 18b, and 18c to the powerful services or functions of the API 64.

The security proxy API 66 also permits replacements of the security system 62 by an alternate third party security framework without forcing the applications 18a, 18b, and 18c to be modified, so long as the security proxy API 66 can continue to provide the services offered by the security proxy API 66. For example, if application 18a sends an authenticateUser(John, Doe, encryptedpassword) function request to the security proxy API 66 and receives a valid response, application 18a does not care and cannot discriminate what third party security framework 62 is employed by the security proxy API 66 to perform the user authentication. The user administration tool 12 is in communication with the security proxy API 66 and employs the functions of the security Proxy API 66 to administer the user profiles 16.

The user administration tool 12 is a centrally hosted web application. A web based graphical user interface (GUI) 20 is in communication with the user administration tool 12. As a web application, changes to the centrally hosted user administration tool 12, for example changes which upgrade the user administration tool 12 with extended functionality, are immediately accessible to the GUI 20 without any need to update software installed on desktop computers or workstations.

In the preferred embodiment the user administration tool 12 is implemented, in whole or in part, as a JAVA servlet. A JAVA servlet is a controller-type of application which supports a do_post( ) method and a do_get( ) method. Every client request, for example a request from the web based GUI 20 initiated by clicking on a submit button in a GUI window, invokes one of these two JAVA servlet methods. These servlet methods are designed to invoke specific business logic methods, for example methods supported by the security proxy API 66, based on information contained in the calls to the servlet methods. The user administration tool 12 JAVA servlet may be hosted by an Apache web server in association with the Apache Tomcat servlet engine, although other third party web servers and servlet engine products may also be employed. For example, the Netscape iPlanet or Bea WebLogic web servers might be employed.

In the preferred embodiment the user administration tool 12 is built employing generic web framework components which may be employed for other web projects. This web framework was developed by examining several concurrent web development projects, identifying common needs, and then developing generic reusable web framework components which may be used in any web development project. The special needs of the web development project are then satisfied by customizing and extending the generic web framework. Note that the generic web framework components employed in practicing the preferred embodiment are not necessary to build the user administration tool 12. An alternative generic web framework could also be employed to build the user administration tool 12 or a non-generic set of web components may be developed and employed to build the user administration tool 12.

In the preferred embodiment the database 14 employs the lightweight directory access protocol (LDAP). In some embodiments the database 14 may be composed of multiple independent data stores, which may provide some advantages for security. For example, it can be a desirable feature to have a first data store for security related user information and a second data store for general user account information. In this case, access to the security related user information may be restricted to the security system 62 and to the administration tool 12. Access by other applications may be prevented by both routers and the security proxy API 66, which may provide more robust security protection.

In some embodiments the database 14 may include a separate LDAP data store in which a supplemental user information, also referred to as an extended user identity, is stored. It is contemplated that this supplemental user information may consist of generic data fields which take on different attribute names depending upon the user to which the supplemental user information is associated. For example, each supplemental user information may include ten generic data fields which may hold any data. The supplemental user information associated with user 1 may define generic data field 1 to contain a social security number and generic data field 2 to contain a spouse's name while the supplemental user information associated with user 2 may define generic data field 1 to contain a passport number and generic data field 2 to contain a citizenship.

It is also contemplated that application specific information about users may be included in the separate LDAP data store contained within the database 14. This application specific user information may include, for example, the most recent unsuccessful attempt to log-in to the application by a user, the number of unsuccessful attempts to log-in to the application in a row by the user, the most recent successful log-in to the application by the user, and other similar information.

In the preferred embodiment the security system 62 is the Netgrity SiteMinder security framework and the API 64 is the SiteMinder API. In this embodiment the security system 62 may also be referred to as an authentication policy server. The security framework comprising the security proxy API 66, the security system API 64, the security system 62, and the security database 14 are discussed in greater details in U.S. patent application Ser. No. 10/284,680, filed Oct. 31, 2002, entitled "Security framework bridge", invented by Ken Boydstun, et al, and in U.S. patent application Ser. No. 10/631,984, filed Jul. 31, 2003, entitled "Business-to-business security integration", invented by Kenneth Boydstun, et al, both of which are incorporated herein by reference for all purposes.

The GUI 20 contains a left navigation element which provides menu selection items Search Users, Create User, Reports, and Logout. Selecting the Logout menu item causes a logout dialog box to display which permits the user to logout of the user administration tool. Selecting the Search Users menu item causes a Search for User Profile dialog box to display. Selecting the Create User menu item causes a dialog box to display which prompts for the entry of a user id. Selecting the Reporting menu item causes a User Report dialog box to display. These GUI dialog boxes will be discussed in more detail below.

Figure 3:
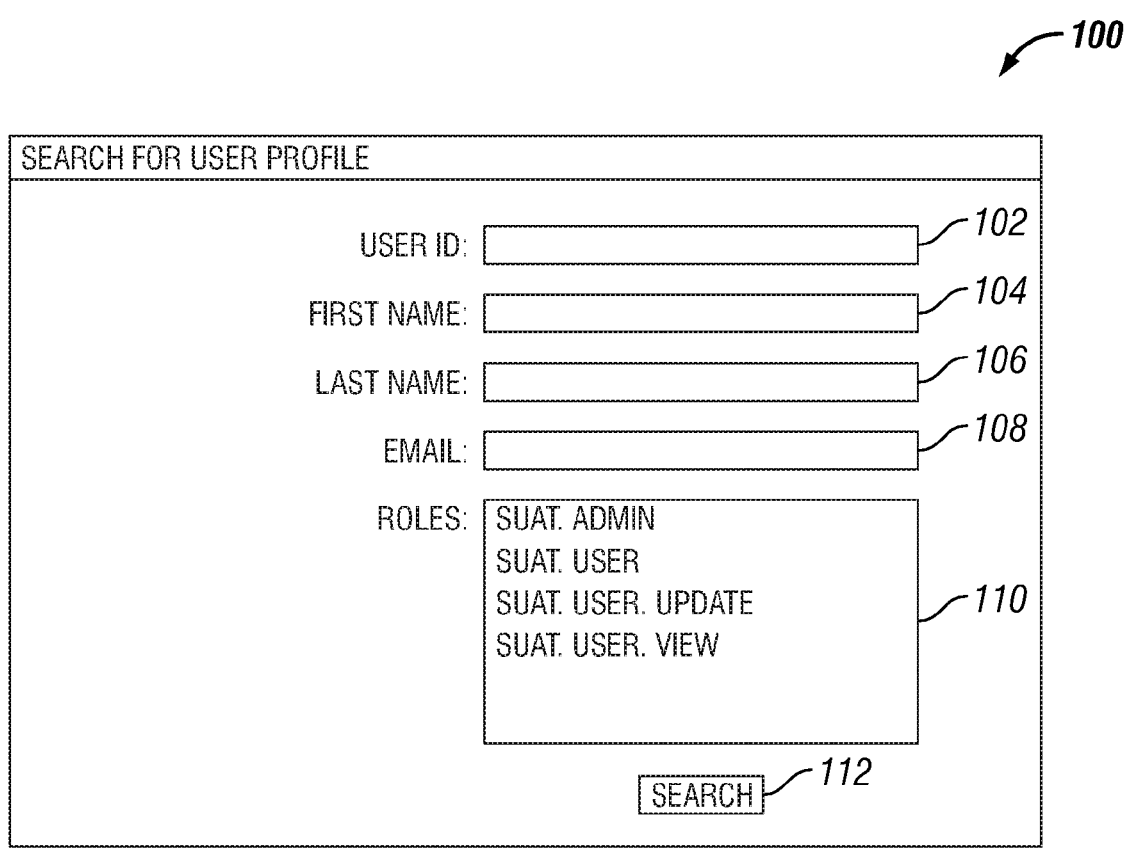
FIG. 3 depicts an exemplary user profile search graphical user interface dialog box.

Turning now to FIG. 3, an exemplary Search for User Profile dialog box 100 is depicted. The dialog box includes boxes for user ID 102, first name 104, last name 106, email 108, a list of roles 110, and a search activation button 112. If a search based on one or more of first name, last name, user id, and/or email address is desired the appropriate text is entered in the boxes 102, 104, 106, 108. If a search based on a role is desired, a role in the list of roles 110 is clicked on using the mouse to highlight the selected role. After a search criteria is constructed by filling text in boxes 102, 104, 106, and/or 108 and by selecting from the list of roles 110, the search button 112 is activated to initiate the search. The search is a logical AND of the several search criteria specified. Note that the roles displayed in the list of roles 110 are limited to those which the administrator who is logged in to the user administration tool 12 is authorized to grant to users. If the roles for which the administrator is authorized change during a session of using the user administration tool, as when a second administrator concurrently edits the first administrator's roles, this list will be updated immediately upon the first administrator clicking on any GUI screen component. This is accomplished because the screen is designed to refresh on every component activation.

When the search button 112 is activated, the request and search criteria are forwarded from the web based GUI 20 to the user administration tool 12, and the user administration tool 12 forwards the search request to the security proxy API 66 to extract the desired information. The security proxy API 66 returns the search results to the user administration tool 12. The user administration tool 12 causes the web based GUI 20 to display a tabular list of user profiles 16 which match the search criteria. The user administration tool 12 user may double click on a user profile 16 in the tabular list, and the modify user profile GUI dialog box 130 will be displayed.

Figure 4:
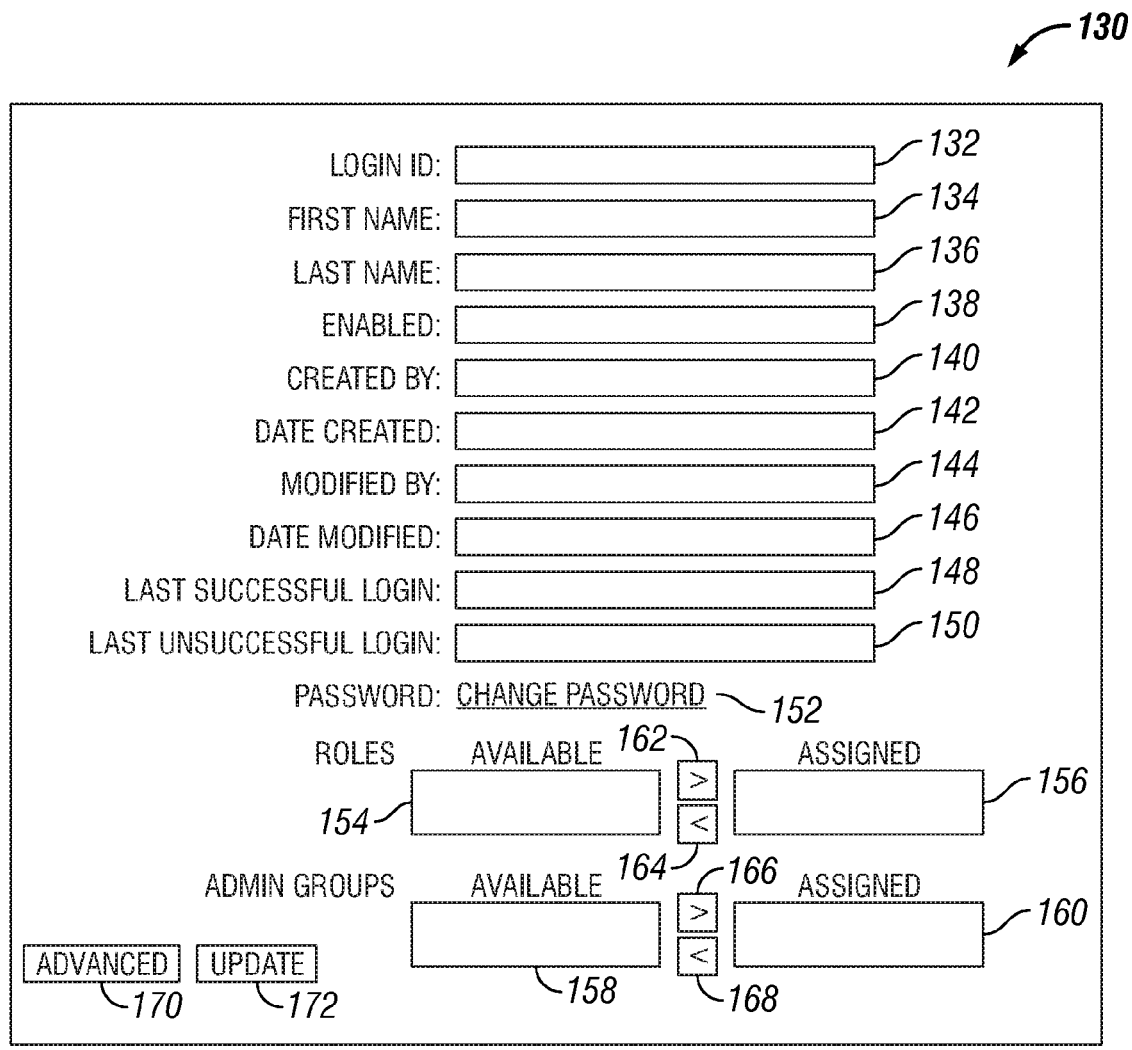
FIG. 4 depicts an exemplary user profile modification graphical user interface dialog box.

Turning now to FIG. 4, an exemplary Modify User Profile dialog box 130 is depicted. The dialog box includes boxes login ID 132, first name 134, last name 136, enabled 138, created by 140, date created 142, modified by 144, date modified 146, last successful login 148, last unsuccessful login 150. The Modify User Profile dialog box 130 includes a change password hypertext link 152. The Modify User Profile dialog box 130 also includes a list of available roles 154, a list of assigned roles 156, a list of available admin groups 158, and a list of assigned admin groups 160.

Note that the roles displayed in the list of available roles 154 and the list of assigned roles 156 and the admin groups displayed in the list of available admin groups 158 and the list of assigned admin groups 160 are limited to those which the administrator who is logged in to the user administration tool 12 is authorized to grant to users. If the roles or admin groups for which the administrator is authorized change during a session of using the user administration tool, as when a second administrator concurrently edits the first administrator's roles or admin groups, these lists will be updated immediately upon the first administrator clicking on any GUI screen component. This is accomplished because the screen is designed to refresh on every component activation. The Modify User Profile dialog box 130 also includes a role assign button 162, a role unassign button 164, an admin group assign button 166, an admin group unassign button 168, an advanced button 170, and an update button 172.

The Enabled box 138 is editable by typing into the box. Possible values which may be used in the Enabled box 138 include active, inactive, and must-change-password.

Roles may be assigned to the user by single clicking on a role in the list of available roles 154 and then selecting the role assign button 162, which causes the role name to be removed from the list of available roles 154 and to be placed in the list of assigned roles 156. Roles may be unassigned to the user by single clicking on a role in the list of assigned roles 156 and then selecting the role unassign button 164, which causes the role name to be removed from the list of assigned roles 156 and to be placed in the list of available roles 154.

Admin groups may be assigned to a user who has an administrator role by single clicking on an admin group in the list of available admin groups 158 and then selecting the group assign button 166, which causes the admin group name to be removed from the list of available admin groups 158 and to be placed in the list of assigned admin groups 160. When an admin group is assigned to a user, the user obtains thereby all the privileges and permissions associated with that group. Admin groups may be unassigned to the user by single clicking on an admin group in the list of assigned admin groups 160 and then selecting the admin group unassign button 168, which causes the admin group name to be removed from the list of assigned admin groups 160 and to be placed in the list of available admin groups 158.

Selecting the update button 172 causes a user profile confirmation dialog box to appear. The user may click a link to return to the Modify User Profile dialog box 130 to correct any mistakes or click on a confirm button to cause the edits to be stored in the database 14. Selecting the advanced button 170 causes another dialog box to pop-up which permits the administrator to edit optional user profile information including site ID, business unit, department, job level, mail stop, manager name, and other information. Selecting an update button on this dialog box similarly causes a user profile confirmation dialog box to appear where the user may click on a link back to the advanced user profile modification dialog box to correct an error or select confirm to cause the edits to be stored in the database 14.

Clicking on the change password hypertext link 152 causes a password change dialog box to pop-up. The dialog box contains an old password box, a new password box, and a new password re-enter box. Filling in the appropriate password information and clicking an update button on the password change dialog box causes the password change to be completed. The text entered in to the password boxes may be disguised by the dialog box displaying asterisks or other non-characters in the place of the password text to prevent others looking over one's shoulder during password modification and discovering one's password.

In some embodiments a distinction between an external user and an internal user may be made. An external user is a non-enterprise employee or an enterprise employee accessing an application hosted outside of the enterprise firewall. For an internal user modification of the user profile 16 is restricted to modifying the assigned roles and admin groups. The change password link 152 is operable only for external users.

If the create user menu item is selected in the left navigation element, the tool user is prompted to enter a user ID to be created. If the user ID already exists, a Search Results screen will display and the user administration tool 12 user is prompted to either enter a new user ID or to click on the user profile 16 displayed in the Search Results screen to modify the user profile. If the user ID is new, a Create User dialog box 200 will display.

Figure 5:
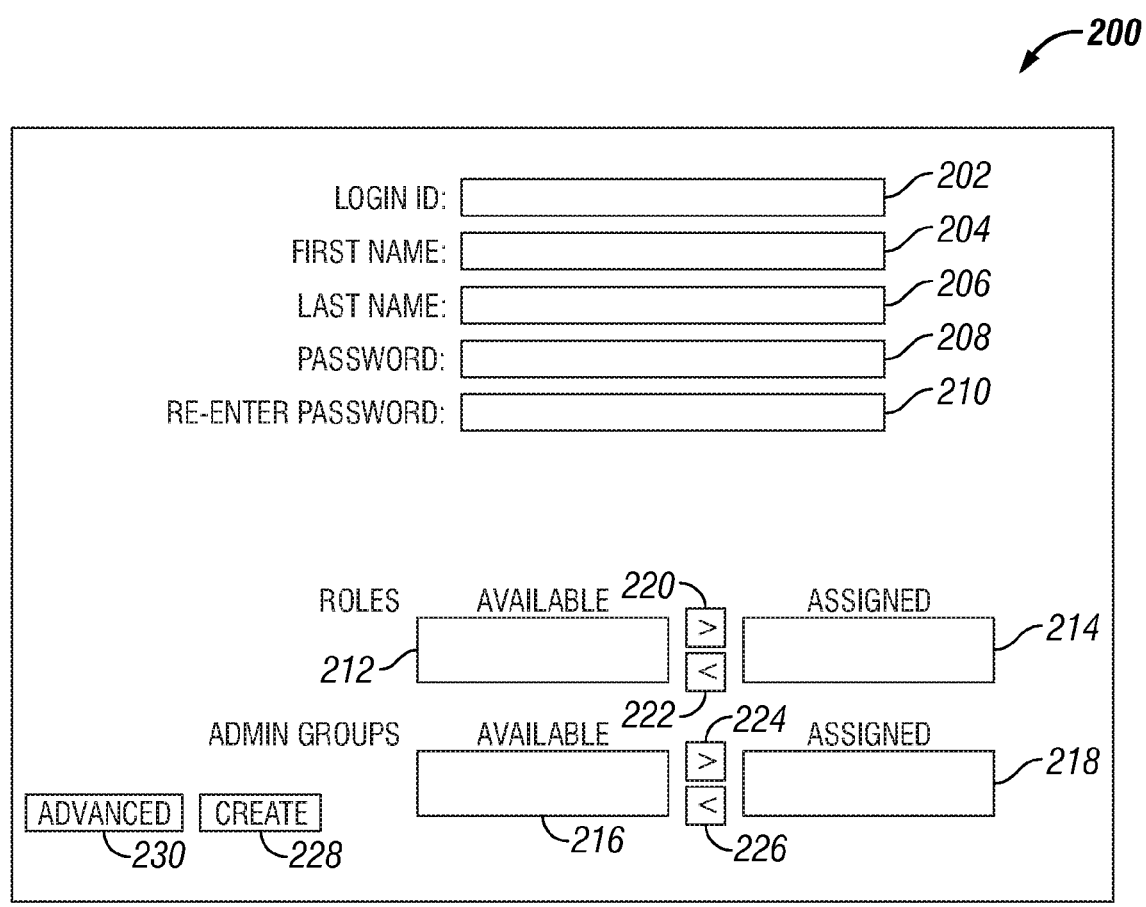
FIG. 5 depicts an exemplary user profile creation graphical user interface dialog box.

Turning now to FIG. 5, an exemplary Create User dialog box 200 is depicted. The Create User dialog box 200 includes a login ID box 202, a first name box 204, a last name box 206, a password box 208, and a re-enter password box 210. The Create User dialog box 200 also includes a roles available list 212, a roles assigned-list 214, an admin groups available list 216, and an admin groups assigned list 218.

Note that the roles displayed in the roles available list 212 and the roles assigned list 214 and the admin groups displayed in the admin groups available list 216 and the admin groups assigned list 218 are limited to those which the administrator who is logged in to the user administration tool 12 is authorized to grant to users. If the roles or admin groups for which the administrator is authorized change during a session of using the user administration tool, as when a second administrator concurrently edits the first administrator's roles, this list will be updated immediately upon the first administrator clicking on any GUI screen component. This is accomplished because the screen is designed to refresh on every component activation. The Create User dialog box 200 also includes a role assign button 220, a role unassign button 222, an admin groups assign button 224, an admin groups unassign button 226, a create button 228, and an advanced button 230.

To create a user, fill in the boxes 202, 204, 206, 208, and 210, assign the appropriate roles and admin groups, and select the create button 228. To assign a role click on the role listed in the roles available list 212 to highlight the role and then click on the role assign button 220. To unassign a role click on the role listed in the roles assigned list 214 to highlight the role and then click on the role unassign button 222. To assign an admin group click on the admin group listed in the admin groups available list 216 to highlight the group and then click on the admin group assign button 224. To unassign an admin group click on the admin group listed in the admin groups assigned list 218 to highlight the admin group and then click on the admin group unassign button 226. In some embodiments there is a distinction made between internal and external users. Internal users may not be created using the user administration tool 12. Clicking on the advanced button 230 causes optional user profile text boxes to be displayed including site ID, business unit, department, job level, mail stop, manager name, and other information, which may be assigned values. Clicking on the create button 228 causes the defined user profile 16 to be created and stored in the database 14.

When the user administration tool 12 user selects the report menu item from the left navigation element a User Report dialog box displays.

Figure 6:
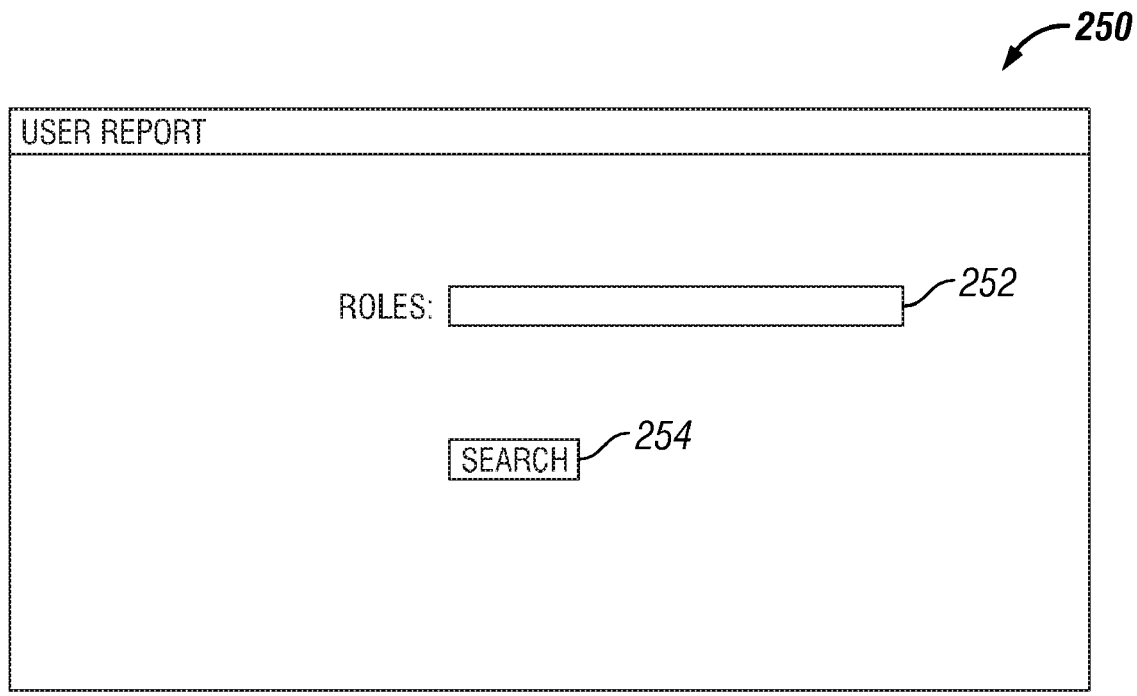
FIG. 6 depicts an exemplary user profile report graphical user interface dialog box.

Turning now to FIG. 6, an exemplary User Report dialog box 250 is depicted. The User Report dialog box 250 includes a roles list 252 and a search button 254. When the user administration tool 12 user selects a role from the roles list 252 by clicking on the role name and selects the search button 254, the web based GUI 20 sends a command to the user administration tool 12 to search for all user profiles 16 which have the role identified in the roles list 252 who have never logged in using this role. In some embodiments the user administration tool 12 writes the search information obtained to a Microsoft Excel file and prompts the user of the user administration tool 12 to open or save the file.

Note that the above GUI dialog boxes are exemplary. The dialog boxes 100, 130, 200, and 250 may be changed in various ways in production including repositioning components within a GUI dialog box, presenting different components and information in the dialog boxes, and breaking a single dialog box into multiple dialog boxes.

In some embodiments it is contemplated that new user roles and admin groups can be defined and inserted into the user administration tool system 10 while the user administration tool system 10 remains in service. Also, it is contemplated that in some embodiments it may be possible to assign a resource to a newly defined user role while the user administration tool system 10 remains in service. For example, a universal reference locator (URL) may logically contain several sub-URLs which may be viewed as resources which need protection, in the sense that access to the sub-URLs should be restricted to authorized users. An administrator, using the user administration tool 10, who has access to the URL may designate one or more of the sub-URLs as named resources and designate user roles which are permitted access to the named resource.

It is contemplated that the user administration tool 12 provides support for application roles for third party applications 18, A third party application 18 may wish to define application roles and to then make decisions based on what application roles are listed in the user profile 16. The user administration tool 12 may provide support for administering these application roles for users. In this case, after a user had been authenticated to access the third party application, the third party application 18 would request from the security proxy API 66 a list of the application roles defined by the third party application that are assigned to the user. The third party application would then use this list of application roles to determine the access the user has to the features and function of the third party application 18.

In some embodiments it is contemplated that a GUI dialog-box or GUI screen will be provided which supports assigning and unassigning roles to a group and then applies this change to each of the user profiles 16 associated with the group. For example, the user administration tool 12 user selects an application from a list of applications displayed, whereupon a list of roles and groups associated with the selected application displays. The user administration tool 12 user selects a group from the list of groups, whereupon a list of user profiles 16 belonging to the selected group is displayed. The user administration tool 12 user selects a role from the list of roles and clicks on a role assignment button, whereupon every user profile 16 listed as associated with the selected group is assigned the selected role.

Figure 7:
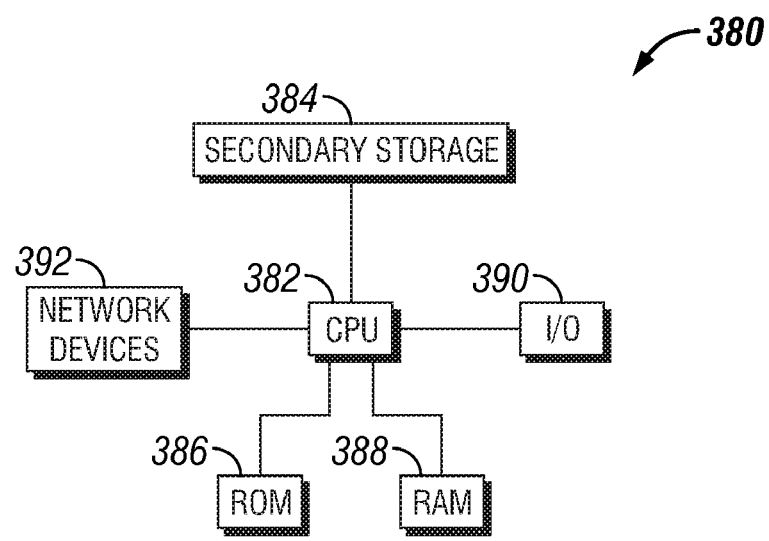
FIG. 7 illustrates an exemplary general purpose computer system suitable for implementing the several embodiments of the user administration tool system.

The user administration tool system 10 described above may be implemented on any general-purpose computer with sufficient processing power, memory resources, and network throughput capability to handle the necessary workload placed upon it. FIG. 7 illustrates a typical, general-purpose computer system suitable for implementing one or more embodiments disclosed herein. The computer system 380 includes a processor 382 (which may be referred to as a central processor unit or CPU) that is in communication with memory devices including secondary storage 384, read only memory (ROM) 386, random access memory (RAM) 388, input/output (I/O) devices 390, and network connectivity devices 392. The processor may be implemented as one or more CPU chips.

The secondary storage 384 is typically comprised of one or more disk drives or tape drives and is used for non-volatile storage of data and as an over-flow data storage device if RAM 388 is not large enough to hold all working data. Secondary storage 384 may be used to store programs which are loaded into RAM 388 when such programs are selected for execution. The ROM 386 is used to store instructions and perhaps data which are read during program execution. ROM 386 is a non-volatile memory device which typically has a small memory capacity relative to the larger memory capacity of secondary storage. The RAM 388 is used to store volatile data and perhaps to store instructions. Access to both ROM 386 and RAM 388 is typically faster than to secondary storage 384.

I/O devices 390 may include printers, video monitors, liquid crystal displays (LCDs), touch screen displays, keyboards, keypads, switches, dials, mice, track balls, voice recognizers, card readers, paper tape readers, or other well-known input devices. The network connectivity devices 392 may take the form of modems, modem banks, ethernet cards, token ring cards, fiber distributed data interface (FDDI) cards, and other well-known network devices. These network connectivity 392 devices may enable the processor 382 to communicate with an Internet or one or more intranets. With such a network connection, it is contemplated that the processor 382 might receive information from the network, or might output information to the network in the course of performing the above-described method steps. Such information, which is often represented as a sequence of instructions to be executed using processor 382, may be received from and outputted to the network.

The processor 382 executes instructions, codes, computer programs, scripts which it accesses from hard disk, floppy disk, optical disk (these various disk based systems may all be considered secondary storage 384), ROM 386, RAM 388, or the network connectivity devices 392.

While several embodiments have been provided in the present disclosure, it should be understood that the disclosed systems and methods may be embodied in many other specific forms without departing from the spirit or scope of the present disclosure.

The present examples are to be considered as illustrative and not restrictive, and the intention is not to be limited to the details given herein, but may be modified within the scope of the appended claims along with their full scope of equivalents. For example, the various elements or components may be combined or integrated in another system or certain features may be omitted, or not implemented.

Also, techniques, systems, subsystems and methods described and illustrated in the various embodiments as discreet or separate may be combined or integrated with other systems, modules, techniques, or methods without departing from the scope of the present disclosure. Other items shown as directly coupled or communicating with each other may be coupled through some interface or device, such that the items may no longer be considered directly coupled to each but may still be indirectly coupled and in communication with one another. Other examples of changes, substitutions, and alterations are ascertainable by one skilled in the art and could be made without departing from the spirit and scope disclosed herein.

What is claimed is:

1. A tool for administering users of a security system, the tool comprising:
 a storage component, stored on a computer readable storage medium, that maintains roles data that includes an authorization component and an application component, wherein the application component includes at least one role defined by a third party application;

a centrally located graphical user interface, stored on a computer readable storage medium, that manages the application component and the authorization component; and a centrally located engine, stored on a computer readable storage medium, that communicates with the storage component via a security system application programming interface, uses the authorization component in determining whether to grant access to the third party application, and communicates the application component to the third party application, wherein the third party application uses the at least one role defined by the third party application and included in the application component in determining a level of access within the third party application itself, wherein the roles data further includes a resource component associated with a system resource such that the centrally located graphical user interface associates a role with the system resource to limit access to the system resource except by a user having the role.

2. The tool of claim 1, wherein the system resource is a universal resource locator.

3. A method for administering users of a security system to provide secure access to a system, comprising:

communicating, by a centrally located engine stored on a computer readable storage medium, with a data store maintaining user profiles via a security application program interface;

managing the user profiles including assigning user roles to the user profiles via a web based graphical user interface stored on a computer readable storage medium;

assigning privileges to the user roles;

providing third party applications;

defining application roles by the third party applications;

assigning the application roles to the user profiles via the web based graphical user interface;

permitting, by the centrally located engine, users to access the third party applications based on the privileges of the user roles associated with the users;

communicating to the third party applications, by the centrally located engine, the application roles assigned to the user profiles of the permitted users;

determining, by the third party applications themselves, levels of access by the users to portions of the third party applications based on the application roles communicated to the third party applications; and accessing the third party applications by the users based on the levels of access determined by the third party applications, wherein at least one of the user roles includes a resource component associated with a system resource, such that the web based graphical user interface associates the at least one of the user roles with the system resource to limit access to the system resource except by a user having the at least one of the user roles.

4. The method of claim 3, further comprising:

identifying a system resource to limit access to by the users;

creating a new role associated with the system resource;

assigning the system resource to the new role; and assigning the new role to the users to provide access to the system resource.

5. The method of claim 3, further comprising:

updating, by a first user via the web based graphical user interface, privileges associated with a second user while the second user accesses a first view of the web based graphical user interface;

requesting access by the second user;

verifying the updated privileges associated with the second user; and providing a second view of the web based graphical user interface for the second user based on the updated privileges associated with the second user.

6. The method of claim 5, wherein the first and second users are further defined as a first and second administrator users.

7. The method of claim 5, wherein the first view of the web based graphical user interface provides at least a first security component operable by users, and wherein the first security component is absent from the second view of the web based graphical user interface.

* * * * *